United States Patent [19]

Baardman et al.

[11] Patent Number: 5,668,249
[45] Date of Patent: Sep. 16, 1997

[54] PROCESS FOR THE COPOLYMERIZATION OF CARBON MONOXIDE WITH AN OLEFINICALLY UNSATURATED COMPOUND

[75] Inventors: Frank Baardman; Arleen Marie Bradford; Jayne Jubb; Pieter Scheerman; Rudolf Jacobus Wijngaarden; Erwin Paulus Petrus Bleeker; Johannes Adrianus Maria Van Broekhoven, all of Amsterdam, Netherlands

[73] Assignee: Shell Oil Company, Houston, Tex.

[21] Appl. No.: 615,649

[22] Filed: Mar. 13, 1996

[30] Foreign Application Priority Data

Mar. 22, 1995 [EP] European Pat. Off. ............... 95200718

[51] Int. Cl.$^6$ .................................................. C08G 67/02
[52] U.S. Cl. .................. 528/392; 528/483; 524/701; 524/706; 524/709; 524/711; 524/765; 524/767; 524/773; 524/785; 522/3; 502/167
[58] Field of Search ....................... 528/392, 483; 524/701, 706, 765, 709, 767, 773, 711, 785; 522/3; 502/167

[56] References Cited

U.S. PATENT DOCUMENTS

| | | | |
|---|---|---|---|
| 5,175,244 | 12/1992 | Budzelaar et al. | 528/392 |
| 5,434,243 | 7/1995 | Mastenbroek et al. | 528/392 |
| 5,440,010 | 8/1995 | Cheron et al. | 528/392 |

FOREIGN PATENT DOCUMENTS

| | | |
|---|---|---|
| 650761 | 3/1994 | European Pat. Off. . |
| 619335 | 10/1994 | European Pat. Off. . |

*Primary Examiner*—Samuel A. Acquah
*Attorney, Agent, or Firm*—Todd F. Volyn

[57] ABSTRACT

A process for the copolymerization of carbon monoxide with an olefinically unsaturated compound in which the monomers are contacted in the presence of a liquid diluent and a protic compound with a catalyst composition which is based on a source of a Group VIII metal and a hydrocarbylborane. A stirring power is transmitted to the polymerization mixture of at least 0.25 kW/m$^3$.

12 Claims, No Drawings

1

PROCESS FOR THE COPOLYMERIZATION OF CARBON MONOXIDE WITH AN OLEFINICALLY UNSATURATED COMPOUND

FIELD OF THE INVENTION

This invention relates to a process for the copolymerization of carbon monoxide with an olefinically unsaturated compound.

BACKGROUND OF THE INVENTION

EP-A-619335 discloses a process for the copolymerization of carbon monoxide with an olefinically unsaturated compound which comprises contacting the monomers with a catalyst composition based on a Group VIII metal and a hydrocarbylborane. This process is suitable for preparing linear alternating copolymers of carbon monoxide with an olefinically unsaturated compound.

The copolymerization process of EP-A-619335 suffers from a rapid decay of the polymerization rate and deactivation of the catalyst. Within an hour the rate of polymerization has been seen to become unattractively low, such that residence times in excess of one hour do not contribute in a meaningful way to the economy of the process. Addition of Group VIII metal compound during the copolymerization does not substantially improve the result.

It has now been found that a substantial improvement with respect to the stability of the polymerization rate can be achieved by carrying out the copolymerization in the presence of a protic compound in combination with applying a stirring power above a certain minimum value. A very suitable protic compound is for example methanol, which is indeed unexpected in view of the statements in EP-A-619335 which would dissuade one from carrying out the copolymerization in the presence of methanol.

SUMMARY OF THE INVENTION

The present invention is a process for the copolymerization of carbon monoxide with an olefinically unsaturated compound comprising contacting the monomers in the presence of a liquid diluent and a protic compound with a catalyst composition which is based on a source of a Group VIII metal and a hydrocarbylborane, with application of a stirring power transmitted to the polymerization mixture of at least 0.25 kW/m$^3$.

DETAILED DESCRIPTION OF THE INVENTION

The improved stability of the polymerization rate enables residence times which can exceed 1 hour and can even exceed 1.5 hours. The inventive process also allows for the preparation of a larger quantity of copolymer relative to the quantity of Group VIII metal employed. Further, EP-A-619355 recommends applying a large excess of the hydrocarbylborane over the Group VIII metal, for example such that the molar ratio of boron/Group VIII metal is about 50:1. But the present process may advantageously be carried out using a molar ratio of boron/Group VIII metal which is lower than the value recommended in EP-A-619335, for example less than 25:1. Thus, besides being attractive from an economic point of view, the inventive process is also attractive in that the quantity of catalyst remnants in the prepared polymer can be lower, which is generally beneficial to polymer properties such as the melt stability.

In the present specification and claims the term "Group VIII metal" encompasses the noble metals ruthenium, rhodium, palladium, osmium, iridium and platinum, and the iron group metals iron, cobalt and nickel.

The catalyst composition suitable for use in the process of the invention is based on a source of cations of the metal(s). Suitable sources of cations of metals of Group VIII include salts of mineral acids, such as salts of sulphuric acid, nitric acid and phosphoric acid, and salts of sulphonic acids, such as methanesulphonic acid and para-toluenesulphonic acid. Preferred sources are salts of carboxylic acids, in particular those having up to 6 carbon atoms, such as acetic acid, propionic acid and trifluoroacetic acid. If desired, as cation source use may be made of the metals in their elemental form, or in a zero-valent state thereof, e.g. in complex form, such as complexes wherein the Group VIII metal is covalently bonded to one or two hydrocarbyl groups. These covalently bonded hydrocarbyl groups may be aliphatic or aromatic and contain typically up to 12 carbon atoms. Preferred covalently bonded hydrocarbyl groups are aliphatic groups, in particular n-alkyl groups, such as methyl and n-butyl groups.

Catalyst compositions based on a noble Group VIII metal are preferred, those based on palladium being most preferred. A preferred source of palladium is palladium (II) acetate.

In addition to a Group VIII metal the catalyst composition contains a hydrocarbylborane. The hydrocarbylborane is typically defined by the general formula BXYZ wherein X, Y and Z denote independently a substituted or unsubstituted hydrocarbyl group, a hydroxy group, a substituted or unsubstituted hydrocarbyloxy group or a halogen atom, on the understanding that at least one of X, Y and Z denotes a substituted or unsubstituted hydrocarbyl group. The hydrocarbyl groups and the hydrocarbyl groups of the hydrocarbyloxy groups may be aliphatic or aromatic groups, such groups typically having up to 12 carbon atoms.

Preferred hydrocarbyl groups are aryl groups which may or may not be substituted. Preferred substituents of the hydrocarbyl groups are electron withdrawing groups or atoms, such as trihalomethyl groups, nitro groups and halogen atoms. Hydrocarbyl groups of which all hydrogen atoms are replaced by substituents are included in the term "hydrocarbyl group". The hydrocarbyl groups are in particular phenyl groups, more particularly perfluorophenyl or 3,5-bis (trifluoromethyl)phenyl groups. Examples of suitable aliphatic groups are ethyl, n-butyl and n-hexyl groups. Halogen atoms X, Y or Z are preferably fluorine. Examples of hydrocarbylboranes are phenyldifluoroborane, phenylboronic acid and hexylboronic acid. It is preferred that all three groups X, Y and Z are hydrocarbyl groups. Preferred hydrocarbylboranes are triphenylborane, tris(perfluorophenyl) borane and tris[3,5-bis(trifluoromethyl)phenyl]borane.

The quantity of hydrocarbylborane may be varied between wide limits. However, as indicated above, it is a particular feature of this invention that the hydrocarbylborane may be used in a quantity such that the molar ratio of boron to the Group VIII metal is less than 25. More preferably, this ratio is in the range of 0.1–20, more preferably yet in the range of 0.5–15, and most preferably in the range of 1–10.

It is advantageous to supply a part of the hydrocarbylborane during the polymerization in order to gain a further improvement in maintaining the polymerization rate at the initial level. For example, 40% or less, preferably 5–30%, of the hydrocarbylborane is supplied at the start of the polymerization and the remainder is supplied in a later stage, prior to work-up, in a continuous fashion or step wise.

The catalyst composition of the inventive process is preferably based, as an additional component, on a ligand which forms a complex with the Group VIII metal. The presence of two complexing sites in one ligand molecule significantly contributes to the activity of the catalysts. It is thus preferred to use a ligand containing at least two dentate groups which can complex with the Group VIII metal. Although less preferred, it is also possible to employ a monodentate ligand, i.e. a compound which contains a single dentate group which can complex with the Group VIII metal. Suitably a bidentate ligand is used which contains two phosphorus-, nitrogen- or sulphur containing dentate groups. It is also possible to use a bidentate mixed ligand such as 1-diphenylphosphino-3-ethylthiopropane.

A preferred group of bidentate ligands can be indicated by the general formula

$R^1R^2M^1$—R—$M^2R^3R^4$ (I)

In this formula $M^1$ and $M^2$ independently represent a phosphorus, arsenic or antimony atom, $R^1$, $R^2$, $R^3$ and $R^4$ independently represent a non-substituted or polar substituted hydrocarbyl group, in particular of up to 10 carbon atoms, and R represents a bivalent organic bridging group containing at least 2 carbon atoms in the bridge.

In the ligands of formula (I) $M^1$ and $M^2$ preferably represent phosphorus atoms. $R^1$, $R^2$, $R^3$ and $R^4$ may independently represent optionally polar substituted alkyl, aryl, alkaryl, aralkyl or cycloalkyl groups. Preferably at least one of $R^1$, $R^2$, $R^3$ and $R^4$ represents an aromatic group, in particular an aromatic group which is polar substituted. Suitable polar groups include halogen atoms, such as fluorine and chlorine, alkoxy groups such as methoxy and ethoxy groups and alkylamino groups such as methylamino-, dimethylamino- and diethylamino groups. Alkoxy groups and alkylamino groups contain in particular up to 5 carbon atoms in each of their alkyl groups.

It is preferred that one or more of $R^1$, $R^2$, $R^3$ and $R^4$ represents an aryl group, preferably a phenyl group, substituted at an ortho position with respect to $M^1$ or $M^2$ with an alkoxy group, especially a methoxy group. This provides a further improvement in maintaining the polymerization rate at the initial level.

In the ligands of formula (I), R preferably represents a bivalent organic bridging group containing from 2 to 4 bridging atoms, at least two of which are carbon atoms. Examples of such groups R are —$CH_2$—$CH_2$—, —$CH_2$—$C_2$—$CH_2$—, and —$CH_2$—$CH_2$—$CH_2$—$CH_2$—. Preferably R is a trimethylene group. Preferred ligands are 1,3-bis[bis (2,4-dimethoxyphenyl)phosphino]propane, 1,3-bis[bis(2,4,6-trimethoxyphenyl)phosphino]propane and, more preferred, 1,3-bis[bis(2-methoxyphenyl)phosphino] propane.

Other suitable bidentate ligands are nitrogen containing compounds of the general formula

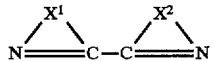

wherein $X^1$ and $X^2$ independently represent organic bridging groups each containing 3 or 4 atoms in the bridge at least 2 of which are carbon atoms. There may be an additional bridging group connecting the bridging groups $X^1$ and $X^2$. Examples of such compounds are 2,2'-bipyridine, 4,4'-dimethyl-2,2'-bipyridine, 4,4'-dimethoxy-2,2'-bipyridine, 1,10-phenanthroline, 4,7-diphenyl-1,10-phenanthroline and 4,7-dimethyl-1,10-phenanthroline. Preferred compounds are 2,2'-bipyridine and 1,10-phenanthroline.

Other suitable bidentate ligands are sulphur containing compounds of the general formula

$R^5S$—Q—$SR^6$ (III)

wherein $R^5$ and $R^6$ independently represent a non-substituted or polar substituted hydrocarbyl group and Q represents a bivalent bridging group containing 2 to 4 carbon atoms in the bridge. The groups $R^5$ and $R^6$ are preferably alkyl groups, each having in particular up to 10 carbon atoms. Very suitable bis thio compounds are 1,2-bis (ethylthio)ethane and 1,2-bis(propylthio)ethene.

Where a monodentate ligand is employed, it is preferred a compound of the following general formula be used:

$R^7R^8R^9M^3$ (IV)

wherein $M^3$ represents a phosphorus, arsenic or antimony atom, each of $R^7$, $R^8$ and $R^9$ independently represents a non-substituted or polar substituted hydrocarbyl group, such as n-alkyl groups and aryl groups, in particular phenyl groups. Suitable substituents are alkoxy groups, in particular having up to 5 carbon atoms, such as methoxy and ethoxy groups. Preferred monodentate ligands are tris(o-tolyl) phosphine, tris(2-methoxyphenyl)phosphine, trinaphthylphosphine and tris(n-butyl)phosphine.

The amount of bidentate ligand supplied may vary considerably, but is usually dependent on the amount of metal of Group VIII, present in the catalyst composition. Preferred amounts of bidentate ligands are in the range of 0.5 to 8, preferably in the range of 0.5 to 2 moles per gram atom of metal of Group VIII, unless the bidentate ligand is a nitrogen bidentate ligand, in which case the bidentate ligand is preferably present in an amount of from 0.5–200 and in particular 1–50 moles per gram atom of metal of Group VIII. The monodentate ligands are preferably present in an amount of from 0.5–50 and in particular 1–25 moles per gram atom of metal of Group VIII.

The performance of the catalyst composition may be improved by incorporating therein an organic oxidant promoter, such as a quinone. Preferred promoters are selected from the group consisting of benzoquinone, naphthoquinone and anthraquinone. The amount of promoter is advantageously in the range of 1–50, preferably in the range of 1 to 10 mole per gram atom of metal of Group VIII.

The amount of catalyst used in the process of the invention may vary between wide limits. As indicated above it is advantageous to employ the least quantity of catalyst composition possible in relation to the quantity of copolymer to be prepared. Recommended quantities of catalyst composition are in the range of $10^{-8}$ to $10^{-2}$, calculated as gram atoms of metal of Group VIII per mole of olefinically unsaturated compound to be copolymerized with carbon monoxide. Preferred quantities are in the range of $10^{-7}$ to $10^{-3}$ on the same basis.

According to this invention, the copolymerization process is carried out in the presence of a protic compound. Examples of protic compounds are acids (such as sulphonic acids, carboxylic acids and adducts of boric acid and glycols or salicylic acids), alcohols and water. The protic compounds have typically 15 or fewer carbon atoms, if any. Preferred acids are those having a pKa of less than 6, more preferably less than 4 and in particular less than 2, when measured in aqueous solution at 18° C. Preferred protic compounds are alcohols, such as primary, secondary and tertiary aliphatic alcohols and phenols. They may be monoalcohols or polyols, such as glycols. Preferred alcohols are the lower alcohols, normally understood to be the monoalcohols which are completely miscible with water, in particular methanol and ethanol. The quantity of the protic compound employed may vary between wide ranges. Eligible quantities of the acids are in the range of 0.5–200, in particular in the range of 1.0 to 50, more in particular in the range of 1.0–10 equivalents per gram atom of Group VIII metal. When the protic compound is an alcohol, in particular a lower alcohol, it may function in the copolymerization as the liquid diluent or it may be incorporated therein, for example in a quantity up to 50% by volume, in particular 5–30% by volume, relative to the total volume of the diluent.

Olefinically unsaturated compounds which can be used as monomers in the copolymerization process of the invention, include compounds consisting exclusively of carbon and hydrogen and compounds which in addition comprise hetero atoms, such as unsaturated esters. Unsaturated hydrocarbons are preferred. Examples of suitable monomers are lower olefins, i.e. olefins containing from 2 to 6 carbon atoms, such as ethene, propene and butene-1, cyclic olefins such as cyclopentene, aromatic compounds, such as styrene and a methylstyrene and vinyl esters, such as vinyl acetate and vinyl propionate. Preference is given to ethene and mixtures of ethene with another a-olefin, such as propene or butene-1.

Generally, the molar ratio of carbon monoxide olefinically unsaturated compound(s) is selected in the range of 1:5 to 5:1. Preferably the molar ratio is in the range of 1:1.5 to 1.5:1, substantially equimolar ratios being preferred most.

The copolymerization process of this invention is carried out in the presence of a liquid diluent. Preferably a diluent is used in which the copolymer to be prepared forms a suspension, in which case a diluent may be selected in which the copolymer is insoluble or virtually insoluble. Examples of diluents are ketones (e.g. acetone), chlorinated hydrocarbons (e.g. chloroform or dichloromethane), aromatics (e.g. toluene, benzene, chlorobenzene) and protic diluents, such as the lower alcohols (e.g. methanol and ethanol). Mixtures of liquid diluents may be used as well, for example protic diluents may comprise aprotic compounds.

When the process of this invention is carried out such that the prepared copolymer is formed as a suspension in the liquid diluent it is advantageous to have a solid particulate material suspended in the diluent before the monomers are contacted with the catalyst composition. This embodiment of the process is advantageous in that it provides a further improvement in maintaining the polymerization rate at the initial level. In this embodiment the catalyst is preferably used as a solution in the diluent. Alternatively it may be advantageous that a catalyst is used which is deposited on the solid particulate material or, otherwise, which is chemically bound to the solid particulate material. Catalysts of the latter type are known in the art, for example from EP-A-511713, EP-A-404228 and EP-A-619334.

Typically a copolymer of carbon monoxide and an olefinically unsaturated compound is used as the solid particulate material, in particular a copolymer which is based on the same monomers as the copolymer to be prepared. The latter means that, for example, when a linear alternating copolymer of carbon monoxide and ethene will be prepared a linear alternating copolymer of carbon monoxide and ethene from an earlier polymer preparation will be suspended in the diluent. Other suitable solid particulate materials may be inorganic or organic materials, such as silica, alumina, talc, soot and polymers, for example polyethene, polypropene and polystyrene.

The solid particulate material is suitably used in a quantity of 0.1–20% w, relative to the weight of the diluent, more suitably in a quantity of 0.5–10% w. The bulk density of the solid particulate material is typically in the range of 50–1000 $kg/m^3$, in particular in the range of 100–500 $kg/m^3$. The solid particulate material has typically an average particle size of $10^{-6}$–$10^{-3}$ m, in particular $10.6^{-6}$–$5\times10^{-4}$ m. The average particle size is determined as follows. With the aid of a commercially available particle size analyser, a cumulative weight distribution of a representative sample of the solid particulate material is determined as a function of the particle size. The cumulative weight distribution function is converted into a cumulative surface area distribution function, as described by Terence Allen in Particle Size Measurement (Chapman and Hall, London, 1981), p. 122 ff. The average particle size is found as the median of the cumulative surface area distribution function.

The copolymerization process of this invention is carried out with the application of a stirring power transmitted to the polymerization mixture of at least 0.25 $kW/m^3$, in particular at least 0.5 $kW/m^3$. When the stirring power applied is less than 0.25 $kW/m^3$ there is a depletion of monomer, in particular of carbon monoxide, in the liquid phase which causes a decay of the rate of copolymerization. A stirring power of at least 0.25 $kW/m^3$ improves this situation. When a diluent is used in which the copolymer to be prepared forms a suspension it is advantageous to apply a stirring power of at least 0.5 $kW/m^3$, in particular at least 1.0 $kW/m^3$. A practicable maximum of the power density is 20 $kW/m^3$. A preferred range of the power density is from 1.5 to 15 $kW/m^3$. The stirring power may be transmitted to the polymerization mixture by any suitable means, for example, a stirring device or a gas stream.

The copolymerization process is usually carried out at a temperature in the range of 20° to 200° C., preferably at a temperature in the range of 30° to 150° C. The reaction is conveniently performed at a pressure in the range of 2 to 200 bar, pressures in the range of 20 to 100 bar being preferred. The process is typically carried out at a scale at which the quantity of liquid diluent exceeds 10 kg. The process may be carried out as a batch process or as a continuous process. In the latter case it is advantageous to apply two or more reactors connected in series, because this increases the quantity of polymer which can be prepared within a given period of time using a certain reaction volume and a certain quantity of catalyst.

The copolymers obtained according to the invention are suitable as thermoplastics for fibers, films or sheets, or for injection molding, compression molding and blowing applications. They may be used for applications in the car industry, for the manufacture of packaging materials for food and drinks and for various uses in the domestic sphere.

The invention will be illustrated by the following non-limiting examples. The diluents were analytical grade chemicals, which were used as purchased.

EXAMPLE 1

(Comparative)

A copolymer of carbon monoxide with ethene and propene was prepared as follows:

Tris(perfluorophenyl)borane (0.247 g, 0.48 mmoles) was weighed in air into a dried Schlenk tube and dissolved in 100 ml dichloromethane. The solution was transferred to a 300 ml autoclave equipped with baffles and an inclined blade stirrer. Subsequently 25 g propene was added. The autoclave was pressurized to 30 bar with premixed carbon monoxide and ethene (1:1 molar ratio). The stirring power applied was about 3 $kW/m^3$. The autoclave was heated to 70° C. $L_2Pd(CH_3CO_2)_2$ (0.0154 g, 0.025 mmoles), wherein $L_2$ denotes 1,3-bis(diphenylphosphino)propane, taken up in 10 ml dichloromethane was injected into the autoclave. The autoclave was pressurized with the carbon monoxide/ethene mixture to 50 bar and maintained at that pressure for 1 hour by supplying additional carbon monoxide/ethene mixture. The pressure was released and the autoclave was allowed to cool to room temperature.

The polymer product was recovered by filtration, washed with dichloromethane and dried.

Polymerization rates were calculated from the rate of addition of the carbon monoxide/ethene mixture. The initial polymerization rate was 10.7 kg copolymer/(g palladium.hour); the rate after 1 hour, i.e. prior to the release of pressure, was 1.0 kg copolymer/(g palladium.hour). Thus, the rate decay was 90%.

EXAMPLE 2

A copolymer of carbon monoxide with ethene and propene was prepared following the procedures outlined in Example 1. However methanol was used instead of dichloromethane.

The initial polymerization rate was 3.0 kg copolymer/(g palladium.hour); the rate after 1 hour, i.e. prior to the release of pressure, was 2.6 kg copolymer/(g palladium.hour). Thus, the rate decay was 13%.

EXAMPLE 3

(Comparative)

A copolymer of carbon monoxide with ethene and propene was prepared following the procedures outlined in Example 1, but using 0.072 mmoles tris(perfluorophenyl) borane was used instead of 0.48 mmoles.

The initial polymerization rate was 5.4 kg copolymer/(g palladium.hour) and after one hour the polymerization rate was 1.1 kg copolymer/(g palladium.hour). The decay in rate was 80%.

EXAMPLE 4

A copolymer of carbon monoxide with ethene and propene was prepared following the procedures outlined in Example 1. However, 0.072 mmoles tris(perfluorophenyl) borane was used instead of 0.48 mmoles and methanol was used as diluent instead of dichloromethane.

The initial polymerization rate was 2.7 kg copolymer/(g palladium.hour) and after one hour the polymerization rate was still 2.7 kg copolymer/(g palladium.hour). There was no decay in rate.

EXAMPLE 5

(Comparative)

A copolymer of carbon monoxide with ethene and propene was prepared following the procedures outlined in Example 1. However, the copolymerization was not terminated after 1 hour and after one hour additional $L_2Pd(CH_3CO_2)_2$ (0.028 g, 0.047 mmoles) (wherein $L_2$ denotes 1,3-bis(diphenylphosphino)propane dissolved in 20 ml dichloromethane) was injected into the autoclave. At the moment of the injection of additional $L_2Pd(CH_3CO_2)_2$ the polymerization rate was 0.1 kg copolymer/(g palladium/hour).

During the hour subsequent to the injection of additional $L_2Pd(CH_3CO_2)_2$ no increase, but only a further decrease of the polymerization rate was detected.

What is claimed is:

1. A process for the copolymerization of carbon monoxide with an olefinically unsaturated compound comprising: (a) contacting the monomers in the presence of a liquid diluent and a lower alcohol with a catalyst composition which comprises a source of a Group VIII metal, and a hydrocarbylborane, and (b) transmitting a stirring power to the polymerization mixture of at least 0.25 kW/m$^3$, wherein the rate of decay of polymerization is no more than 13% over the course of an hour.

2. A process as claimed in claim 1, wherein the Group VIII metal is palladium and that the hydrocarbylborane is represented by the general formula BXYZ wherein X, Y and Z denote independently substituted or unsubstituted hydrocarbyl groups.

3. A process as claimed in claim 1 wherein the hydrocarbylborane is used in a quantity such that the molar ratio of boron to the Group VIII metal is in the range of 0.1–20.

4. A process as claimed in claim 1 wherein a portion of the hydrocarbylborane is supplied at the start of the polymerization and the remainder is supplied in a later stage, in a continuous fashion or step wise.

5. A process as claimed in claim 1 further comprising the addition of catalyst component comprising a bidentate ligand of the general formula

$$R^1R^2M^1\text{—}R\text{—}M^2R^3R^4 \qquad (I)$$

wherein $M^1$ and $M^2$ independently represent a phosphorus, arsenic or antimony atom, $R^1$, $R^2$, $R^3$ and $R^4$ independently represent a non-substituted or polar substituted hydrocarbyl group provided that one or more of $R^1$, $R^2$, $R^3$ and $R^4$ represents an aryl group, substituted at an ortho position with respect to $M^1$ or $M^2$ with an alkoxy group, and R represents a bivalent organic bridging group containing at least 2 carbon atoms in the bridge.

6. A process as claimed in claim 1 wherein the protic compound is selected from the group consisting of acids having a pKa of less than 6, alcohols and water.

7. A process as claimed in claim 6 wherein the protic compound is a lower alcohol.

8. A process as claimed in claim 1 wherein the liquid diluent is an aromatic diluent or a protic diluent.

9. A process as claimed claim 1 wherein the olefinically unsaturated compound is ethene or a mixture of ethene with another a-olefin, the molar ratio of carbon monoxide and the olefinically unsaturated compound(s) is in the range of 1:5 to 5:1, the quantity of catalyst composition is in the range of $10^{-8}$ to $10^{-2}$, calculated as gram atoms of metal of Group VIII per mole of olefinically unsaturated compound to be copolymerized, a temperature is selected in the range of 20° and 200° C., and a pressure is selected in the range of 2 and 200.

10. A process as claimed in claim 1 wherein the stirring power transmitted to the polymerization mixture is at least 0.5 kW/m$^3$.

11. A process as claimed in claim 1 wherein a diluent is present in which the copolymer to be prepared forms a suspension and the stirring power transmitted to the polymerization mixture is at least 0.5 kW/m$^3$.

12. A process as claimed in claim 11 wherein a solid particulate material is suspended in the liquid diluent before the monomers are contacted with the catalyst composition.

* * * * *